UNITED STATES PATENT OFFICE.

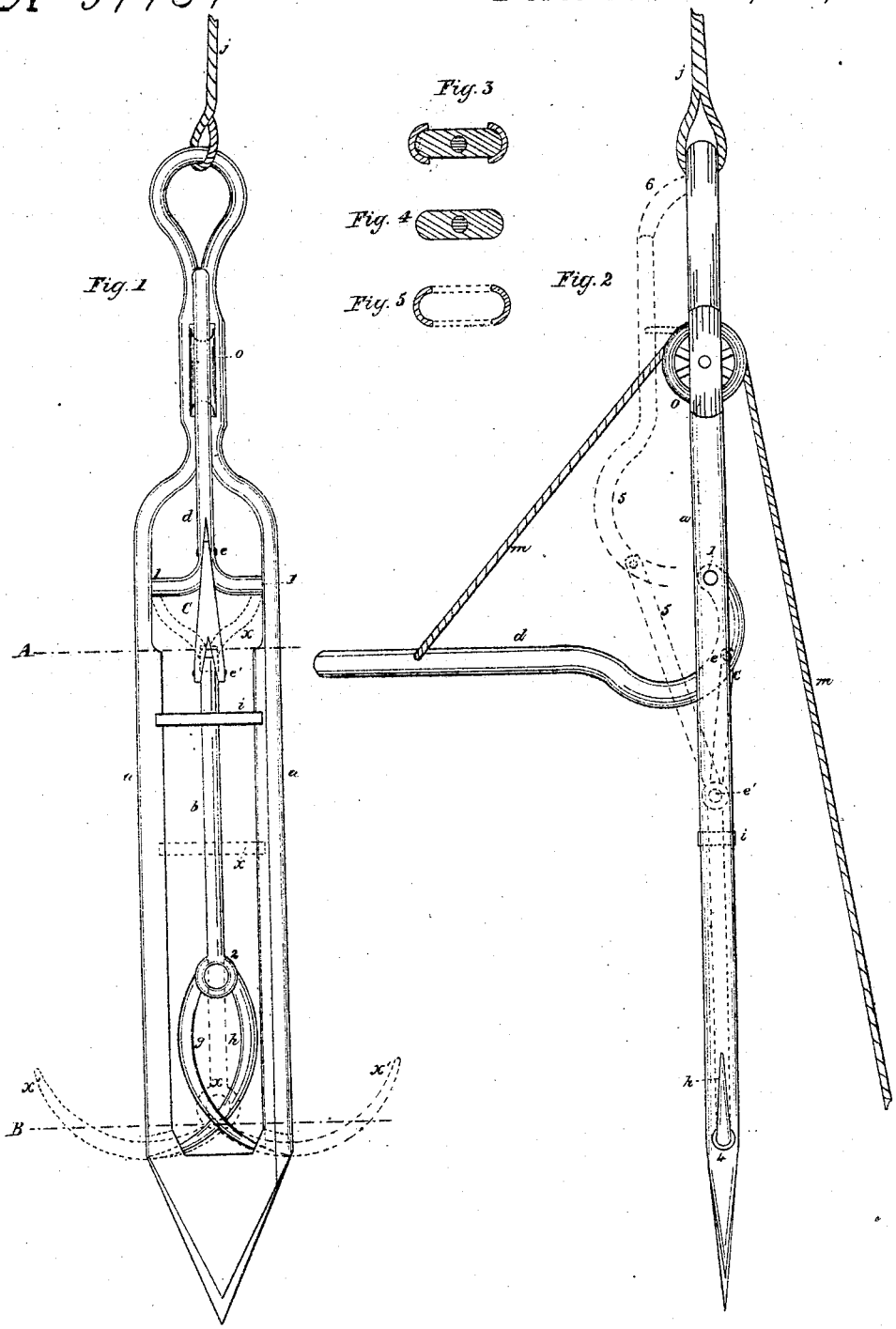

WILLIAM S. SPRATT, OF WEST MANCHESTER, PENNSYLVANIA.

IMPROVEMENT IN HORSE HAY-FORKS.

Specification forming part of Letters Patent No. 57,789, dated September 4, 1866; antedated August 17, 1866.

*To all whom it may concern:*

Be it known that I, WILLIAM S. SPRATT, of West Manchester, in the county of Allegheny, State of Pennsylvania, have invented a new and useful Improvement in Hay-Elevators; and I do hereby declare that the following is a full and exact description thereof, reference being had to the accompanying drawings, and to the letters of reference marked thereon.

My invention consists in the use of a spear-pointed frame furnished with receding and expanding prongs, which are operated by means of a guided and jointed rod and lever arranged with relation to said frame, and operating in the manner hereinafter described.

To enable others skilled in the art to make and use my invention, I will proceed to describe its construction and operation.

In the accompanying drawings, Figure 1 represents a front elevation of my improved hay-elevator. Fig. 2 represents a side elevation of the same. Fig. 3 represents a section of the frame when the side bars of the frame are made of concave iron, and also represents the form of the guide for the jointed rod when concave iron is used in the construction of the frame. Fig. 4 represents the guide shown in Fig. 3. Fig. 5 represents the concave iron shown in Fig. 3; also represents a transverse section of the frame when cut through at line B, shown in Fig. 1.

In the drawings, $a$ represents the spear-pointed frame, which is made in the form represented by Figs. 1 and 2. $b$ and $c$ represent the jointed rod, which is connected to the operating-lever $d$ at the point marked $e$, and hinged to the rod $b$ at the point marked $e'$. On the lower end of rod $b$ are hinged two curved prongs, marked $g$ and $h$, the points of which are sheathed in the openings marked 4 of the frame. The rod $b$ is furnished with a guide, marked $i$, which guide, in connection with the movement of the prongs $g$ and $h$ through the openings 4, will always keep the rod $b$ in line with the frame $a$, and thereby give a true and certain action to the prongs $g$ and $h$.

The lever $d$ is hinged to the frame at the point marked 1, and is made in the form represented in Figs. 1 and 2. Near the end of the lever $d$ is attached the unshipping cord or rope, which passes over the pulley marked $o$, which is in the upper part of the frame. $j$ represents the rope or chain used for hoisting the elevator and its load.

When concave iron is used it is thought best to use it only in that part of the frame between lines A and B, and it is thought best to bend the outer end of the lever $d$ in the form represented by the dotted lines 6 in Fig. 2, so that it will not catch in the hay when drawing the elevator from the hay or mow.

The operation of my improvement is as follows: The spear-pointed frame, when the various parts are in the position as represented in Fig. 1, is forced down into the hay. The lever $d$ is then forced down into the position represented in Fig. 2. This forcing down of lever $d$ will force down the rods $c$ and $b$, which will force out the prongs $g$ and $h$ into the hay, the prongs entering the hay at or on a line at right angles with the plane of the frame $a$, and then gradually curve upward until they assume the position represented by the dotted lines marked $x'$. The elevator is then hoisted up until it reaches the place for depositing the hay. Then the cord $m$ is drawn down, which will draw up the lever $d$, which will draw up the rods $c$ and $b$, which will draw in the prongs $g$ and $h$, so that the elevator may with ease be drawn from the hay.

The dotted lines $x$ and $x'$ represent the position of the lever-rods and prongs when hoisting the hay, and the dotted lines 5 and 6 represent the position of the lever $d$ and rod $c$ when the various parts are unshipped, so that the hay may drop from the elevator, or so that it may be drawn from the hay.

Having thus described the nature, construction, arrangement, and operation of the various parts, I desire to call attention to a leading feature of my improvement, for the other parts all tend to the accomplishment of this one feature.

Hay-elevators having receding and expanding prongs, as heretofore constructed, are very liable to become unshipped—that is to say, the prongs are liable to recede by the pressure and weight brought on the prongs by the hay in hoisting it. Now, the object of my invention is to avoid and overcome this evil and trouble in hay-elevators. To accomplish this very desirable end, I have made the rod which operates the prongs in two parts, as described, and so arranged these parts with relation to each other and to the lever which operates them that when the prongs are expanded the upper part of the rod marked $c$ is thrown out, so that it stands in an oblique position to the plane of the spear-pointed frame, thereby holding the prongs and other parts attached thereto in a fixed and permanent position until unshipped by the operator.

I wish it clearly understood that I do not claim, broadly, a spear-pointed frame or receding and expanding prongs operated by a rod. Such are well known; but What I do claim is—

The combination and arrangement of the rod $b$, provided with guide $i$ and prongs $g$ and $h$, link or rod $c$, lever $d$, and pulley $o$, when used in connection with the frame $a\ a$, constructed, arranged, and operating in the manner herein described, and for the purpose set forth.

W. S. SPRATT.

Witnesses:
JAMES J. JOHNSTON,
JOHN DENTON.